US009088022B2

(12) United States Patent
Iwamura et al.

(10) Patent No.: US 9,088,022 B2
(45) Date of Patent: Jul. 21, 2015

(54) FUEL CELL

(75) Inventors: Naoki Iwamura, Kawasaki (JP); Hirofumi Kan, Kawasaki (JP); Daisuke Watanabe, Chigasaki (JP); Hidenori Suzuki, Saku (JP); Shunsuke Kimura, Tokyo (JP)

(73) Assignee: Murata Manufacturing Co., Ltd., Nagaokakyo-shi (JP)

( * ) Notice: Subject to any disclaimer, the term of this patent is extended or adjusted under 35 U.S.C. 154(b) by 172 days.

(21) Appl. No.: 13/423,893

(22) Filed: Mar. 19, 2012

(65) Prior Publication Data

US 2012/0231361 A1    Sep. 13, 2012

Related U.S. Application Data

(63) Continuation of application No. PCT/JP2010/006363, filed on Oct. 28, 2010.

(30) Foreign Application Priority Data

Oct. 28, 2009  (JP) ................................. 2009-248100

(51) Int. Cl.
*H01M 8/04* (2006.01)
*H01M 8/10* (2006.01)

(52) U.S. Cl.
CPC ...... *H01M 8/04544* (2013.01); *H01M 8/04201* (2013.01); *H01M 8/04388* (2013.01); *H01M 8/04559* (2013.01); *H01M 8/04626* (2013.01); *H01M 8/04753* (2013.01);
(Continued)

(58) Field of Classification Search
USPC ................................................ 429/400–535
See application file for complete search history.

(56) References Cited

U.S. PATENT DOCUMENTS

2004/0009381 A1    1/2004  Sakai et al.
2007/0264544 A1*   11/2007 Jang et al. ........................ 429/17
(Continued)

FOREIGN PATENT DOCUMENTS

JP    64-000655 A    1/1989
JP    2004-134199 A  4/2004
(Continued)

OTHER PUBLICATIONS

English Translation of International Preliminary Report on Patentability and Written Opinion issued Jun. 21, 2012 in PCT/JP2010/006363.

(Continued)

*Primary Examiner* — Maria J Laios
(74) *Attorney, Agent, or Firm* — Oblon, McClelland, Maier & Neustadt, L.L.P.

(57) ABSTRACT

A fuel cell has a fuel cell main body, a fuel supply unit, a voltage sensor, a supply speed determining unit, a fuel supply control unit, and a connecting unit. The voltage sensor measures the open-circuit voltage of the fuel cell main body. The supply speed determining unit determines the fuel supply speed of the fuel supply unit, on the basis of the results obtained from the measurement performed by the voltage sensor, in the case where the voltage measured by the voltage sensor is smaller than a predetermined value. The fuel supply control unit controls, on the basis of the supply speed thus determined, the fuel supply from the fuel supply unit. The connecting unit connects a load to the fuel cell main body, in the case where the voltage measured by the voltage sensor is larger than the predetermined value.

8 Claims, 7 Drawing Sheets

(52) U.S. Cl.
CPC ............ *H01M 8/1011* (2013.01); *Y02E 60/50* (2013.01); *Y02E 60/523* (2013.01)

(56) References Cited

U.S. PATENT DOCUMENTS

| | | | |
|---|---|---|---|
| 2008/0003462 A1* | 1/2008 | Aleyraz et al. ................. | 429/13 |
| 2008/0070070 A1 | 3/2008 | Sakai et al. | |
| 2009/0186257 A1 | 7/2009 | Sakai et al. | |
| 2010/0173212 A1 | 7/2010 | Senoue et al. | |
| 2010/0261080 A1 | 10/2010 | Kanie | |

FOREIGN PATENT DOCUMENTS

| | | |
|---|---|---|
| JP | 2004-152741 A | 5/2004 |
| JP | 2005-149838 A | 6/2005 |
| JP | 2006-080092 A | 3/2006 |
| JP | 2007-053012 A | 3/2007 |
| JP | 2007-234347 A | 9/2007 |
| JP | 2009-087741 A | 4/2009 |
| JP | 2009-110806 A | 5/2009 |
| JP | 2010-033900 A | 2/2010 |
| JP | 2010-044997 A | 2/2010 |
| JP | 2010-067473 A | 3/2010 |
| WO | WO 2009/041370 A1 | 4/2009 |
| WO | WO 2009/057534 A1 | 5/2009 |
| WO | WO 2010/013709 A1 | 2/2010 |
| WO | WO 2010/021231 A1 | 2/2010 |

OTHER PUBLICATIONS

International Search Report issued Feb. 1, 2011 in PCT/JP2010/006363 filed Oct. 28, 2010 (with English Translation).
Written Opinion Report issued Feb. 1, 2011 in PCT/JP2010/006363 filed Oct. 28, 2010.

* cited by examiner

– 1 –
FUEL CELL

CROSS-REFERENCE TO RELATED APPLICATIONS

This application is a continuation of prior International Application No. PCT/JP2010/006363, filed on Oct. 28, 2010 which is based upon and claims the benefit of priority from Japanese Patent Application No. 2009-248100 filed on Oct. 28, 2009; the entire contents of all of which are incorporated herein by reference.

FIELD

Embodiments described herein relate generally to a fuel cell.

BACKGROUND

Attempts are being made to downsize electronic equipment such as cellular phones, personal digital assistants and the like. In addition to the downsizing of the electronic equipment, attempts are also being made to use a fuel cell for the power source of the electronic equipment. The fuel cell can generate electricity by merely supplying fuel and air and can continuously generate electricity by changing and replenishing the fuel only. Therefore, if the fuel cell can be downsized, it is effective as a power source for compact electronic equipment.

As the fuel cell, a direct methanol fuel cell (hereinafter referred to as DMFC) attracts attention. The DMFC is classified according to a liquid fuel supplying method, and the supplying method includes an active method such as a gas supply type, a liquid supply type or the like and a passive method such as an inside vaporization type which supplies the liquid fuel from a fuel storing unit to a fuel electrode by vaporizing in the cell. Between them, the passive method is advantageous for downsizing of the DMFC.

It is usual that the fuel cell is activated and put into a steady operation state before it is connected to a load.

It was found that the startup of the DMFC becomes instable occasionally due to an external environment, and particularly a temperature. That is, the fuel tank inner pressure increases in a high temperature environment, and the fuel supply amount from the fuel tank to the DMFC increases easily. On the other hand, the fuel tank inner pressure decreases in a low temperature environment, and the fuel supply amount from the fuel tank to the DMFC decreases easily. Therefore, the supply of the fuel becomes excessive in the high temperature environment, and the DMFC temperature rises sharply, resulting in possibility of an occurrence of overshooting. On the other hand, the supply of the fuel becomes insufficient in the low temperature environment, and it might take time to startup the DMFC.

To remedy the instable startup of the DMFC due to the influence of the outside temperature, it is considered to measure the outside temperature and to control the fuel supply depending on the outside temperature.

But, it is not preferable to dispose a sensor for measuring the outside temperature because the DMFC will have a complex equipment structure. The temperature of the DMFC itself can be measured by a temperature sensor disposed within the DMFC. On the other hand, the measurement of an outside temperature of the DMFC requires the temperature sensor disposed outside the DMFC, and the equipment structure of the DMFC becomes complex.

In view of the above, it is desired to have a fuel cell startup method which has excellent robustness with respect to an outside temperature and does not require a sensor for measuring the outside temperature.

DETAILED DESCRIPTION

The fuel cell of an embodiment has a fuel cell main body, a fuel supply unit, a voltage sensor, a supply speed determining unit, a fuel supply control unit, and a connecting unit. The voltage sensor measures the open-circuit voltage of the fuel cell main body. In a case where the voltage measured by the voltage sensor is smaller than a predetermined value, the supply speed determining unit determines the fuel supply speed of the fuel supply unit on the basis of the results obtained from the measurement performed by the voltage sensor. On the basis of the supply speed thus determined, the fuel supply control unit controls the fuel supply from the fuel supply unit. The connecting unit connects a load to the fuel cell main body in the case where the voltage measured by the voltage sensor is larger than the predetermined value.

Figure 1:
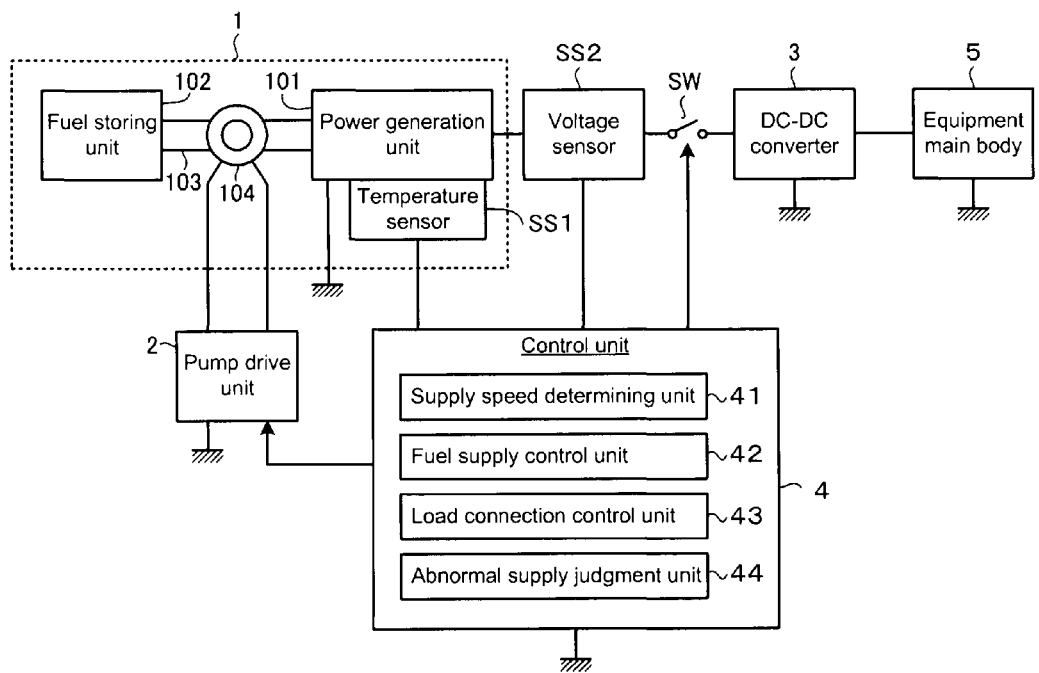
FIG. 1 is a block diagram showing a schematic configuration of the fuel cell system according to an embodiment of the invention.

Embodiments are described below with reference to the drawings. The fuel cell shown in FIG. 1 is provided with a fuel cell main body (DMFC) 1, a pump drive unit 2, a DC-DC converter 3, a control unit 4, a temperature sensor SS1, a voltage sensor SS2, and a switch SW.

The fuel cell main body 1 has a power generation unit 101, a fuel storing unit 102, a passage 103, a pump 104, and the temperature sensor SS1. The power generation unit (cell) 101 generates power by combustion of fuel and configures an electromotive portion of a fuel cell system. The fuel storing unit 102 stores the liquid fuel used by the power generation unit 101. The passage 103 connects the fuel storing unit 102 and the power generation unit (cell) 101. The pump 104 is a fuel supply means for transferring the liquid fuel from the fuel storing unit 102 to the power generation unit (cell) 101.

Figure 2:
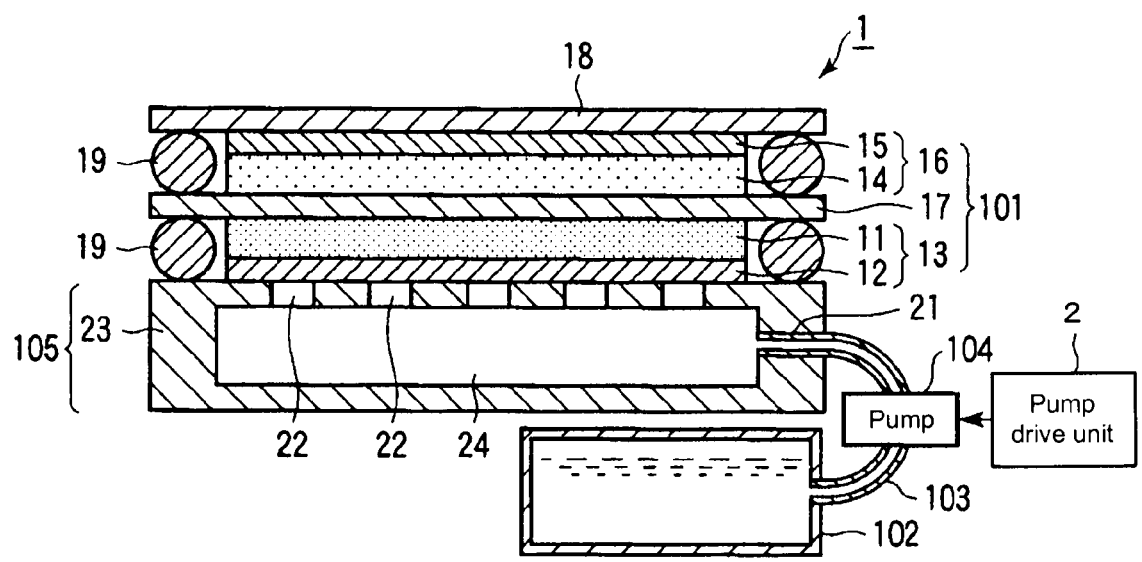
FIG. 2 is a sectional view of a fuel cell main body 1.

As shown in FIG. 2, the power generation unit 101 has a membrane electrode assembly (MEA) which comprises an anode (fuel electrode) 13 having an anode catalyst layer 11 and an anode gas diffusion layer 12, a cathode (air electrode/oxidant electrode) 16 having a cathode catalyst layer 14 and a cathode gas diffusion layer 15, and a proton (hydrogen ion) conductive electrolyte membrane 17 held between the anode catalyst layer 11 and the cathode catalyst layer 14.

The catalyst contained in the anode catalyst layer 11 and the cathode catalyst layer 14 includes, for example, a sole platinum group element such as Pt, Ru, Rh, Ir, Os or Pd, an alloy containing the platinum group elements, or the like. Pt—Ru or the like having high resistance to methanol and carbon monoxide is preferably used for the anode catalyst layer 11. Pt, Pt—Co or the like is preferably used for the cathode catalyst layer 14. The catalyst is not limited to the above, but various types of substances having catalyst activity can be used. The catalyst may be a supported catalyst using a conductive carrier such as carbon material, or a non-supported catalyst.

Examples of a proton conductive material configuring the electrolyte membrane 17 include an organic material such as a fluorine-based resin (Nafion (trade name, a product of DuPont), Flemion (trade name, a product of Asahi Glass Co., Ltd.), etc.) such as a perfluorosulfonic acid polymer having a sulfonic group, a hydrocarbon-based resin having the sulfonic group, or the like, or an inorganic material such as tungstic acid, phosphotungstic acid or the like. But, the proton conductive electrolyte membrane 17 is not limited to the above.

The anode gas diffusion layer 12 stacked on the anode catalyst layer 11 serves to uniformly supply the fuel to the anode catalyst layer 11 and also serves as a power collector of the anode catalyst layer 11. The cathode gas diffusion layer 15 stacked on the cathode catalyst layer 14 serves to uniformly supply an oxidant to the cathode catalyst layer 14 and also serves as a power collector of the cathode catalyst layer 14. The anode gas diffusion layer 12 and the cathode gas diffusion layer 15 are configured of a porous base material.

If necessary, a conductive layer is stacked on the anode gas diffusion layer 12 and the cathode gas diffusion layer 15. As the conductive layer, there is used, for example, a porous layer (such as mesh), a porous film, a foil made of an electrically conductive metal material such as Au or Ni, or a composite material having a good conductive metal such as gold or carbon coated on an electrically conductive metal material such as stainless steel (SUS) or Cu.

A rubber O-ring 19 is interposed between the electrolyte membrane 17 and a fuel distribution mechanism 105 and a cover plate 18 both described later to prevent a fuel leak or an oxidant leak from the power generation unit 101.

The cover plate 18 has an opening (not shown) for taking in air as an oxidant. If necessary, a moisture retaining layer or a surface layer is disposed between the cover plate 18 and the cathode 16. The moisture retaining layer suppresses water evaporation by partially impregnating water generated by the cathode catalyst layer 14 and also promotes uniform diffusion of air into the cathode catalyst layer 14. The surface layer adjusts an air intake amount and has plural air introduction ports of which number, size and the like are adjusted depending on the air intake amount.

The fuel distribution mechanism 105 is arranged on the side of the anode (fuel electrode) 13 of the power generation unit 101. The fuel distribution mechanism 105 is connected to the fuel storing unit (fuel tank) 102 through the passage 103 for the liquid fuel, such as piping.

The fuel storing unit 102 stores the liquid fuel suitable for the power generation unit 101. The liquid fuel includes methanol fuels such as various concentrations of aqueous methanol solutions, pure methanol and the like. The liquid fuel is not necessarily limited to the methanol fuel. For example, the liquid fuel may be an ethanol fuel such as an aqueous ethanol solution or pure ethanol, a propanol fuel such as an aqueous propanol solution or pure propanol, a glycol fuel such as an aqueous glycol solution or pure glycol, dimethyl ether, formic acid, or the like. At any event, the fuel storing unit 102 stores the liquid fuel suitable for the power generation unit 101.

The fuel is introduced into the fuel distribution mechanism 105 from the fuel storing unit 102 through the passage 103. The passage 103 is not limited to a pipe which is independent of the fuel distribution mechanism 105 and the fuel storing unit 102. For example, in a case where the fuel distribution mechanism 105 and the fuel storing unit 102 are stacked into one body, the passage 103 may be a fuel passage which connects them. It is adequate when the fuel distribution mechanism 105 is connected to the fuel storing unit 102 through the passage 103.

Figure 3:
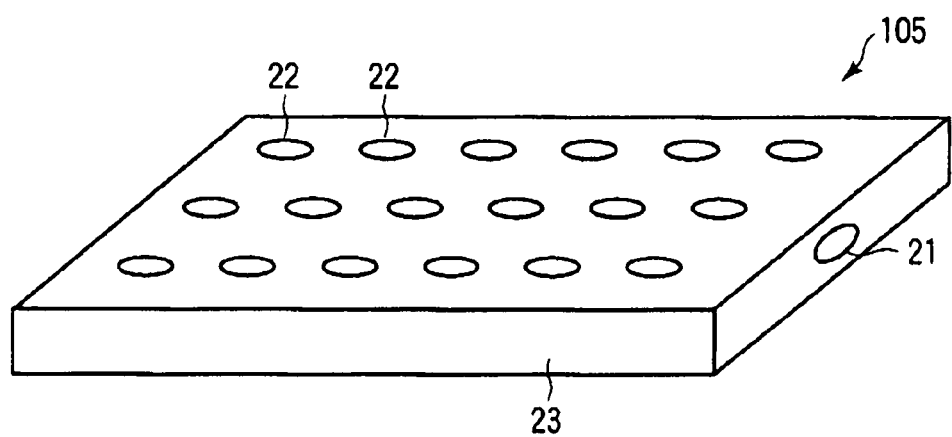
FIG. 3 is a perspective view of a fuel distribution mechanism 105.

As shown in FIG. 3, the fuel distribution mechanism 105 is provided with a fuel distribution plate 23 having at least one fuel inlet opening 21, into which the fuel flows through the passage 103, and plural fuel output openings 22 which discharge the fuel and its vaporized component. As shown in FIG. 2, the fuel distribution plate 23 has therein a space unit 24 which forms a fuel passage for the liquid fuel introduced through the fuel inlet opening 21. The plural fuel output openings 22 each are directly connected to the space unit 24 serving as the fuel passage.

The fuel introduced from the fuel inlet opening 21 into the fuel distribution mechanism 105 is entered into the space unit 24 and introduced into the plural fuel output openings 22 via the space unit 24 serving as a fuel passage. For example, a vapor-liquid separator (not shown) which allows passage of only the vaporized component of the fuel but not the liquid component may be disposed at the plural fuel output openings 22. Thus, the vaporized component of the fuel is supplied to the anode (fuel electrode) 13 of the power generation unit 101. The vapor-liquid separator may be disposed as a vapor-liquid separation film or the like between the fuel distribution mechanism 105 and the anode 13. The vaporized component of the fuel is discharged from the plural fuel output openings 22 toward the plural portions of the anode 13.

The fuel output openings 22 are disposed in plural in the plane of the fuel distribution plate 23, which is contacted to the anode 13, so that the fuel can be supplied to the entire power generation unit 101. The number of the fuel output openings 22 is appropriately two or more, but it is preferable that the fuel output openings 22 of 0.1 to 10/cm$^2$ are formed in order to uniformize the fuel supply amount in the plane of the power generation unit 101.

The pump 104 as a fuel transfer control means is disposed at a position on the passage 103 which connects the fuel distribution mechanism 105 and the fuel storing unit 102. This pump 104 is not a circulation pump for circulation of the fuel but a fuel supply pump which transports the fuel from the fuel storing unit 102 to the fuel distribution mechanism 105. By sending the fuel by the pump 104 if necessary, controllability of the fuel supply amount is enhanced. In this case, as the pump 104, a rotary vane pump, an electro-osmotic pump, a diaphragm pump, a tubing pump or the like is preferably used from a view point that a small amount of fuel can be sent under control and further reduction in size and weight can be made. The rotary vane pump rotates the vanes by a motor to send the fuel. The electro-osmotic pump uses a sintered porous body of silica or the like to cause an electro-osmotic flow phenomenon. The diaphragm pump sends the fuel by driving a diaphragm by an electromagnet or piezoelectric ceramics. The tubing pump presses partly a fuel passage having flexibility to send the fuel by squeezing. Among them, it is more preferable to use the electro-osmotic pump or the diaphragm pump having the piezoelectric ceramics from a view point of driving power, size and the like.

The fuel stored in the fuel storing unit 102 is transferred through the passage 103 by the pump 104 and supplied to the fuel distribution mechanism 105. And, the fuel discharged from the fuel distribution mechanism 105 is supplied to the anode (fuel electrode) 13 of the power generation unit 101.

The fuel storing unit 102 may be disposed between the pump 104 and the fuel distribution mechanism 105 to transfer the liquid fuel by pressurizing the fuel storing unit 102 by the pump 104. In this case, it is configured to dispose a fuel cutoff valve between the fuel storing unit 102 and the fuel distribution mechanism 105, so that it becomes possible to control the supply of the liquid fuel by means of the passage.

Within the power generation unit 101, the fuel is diffused in the anode gas diffusion layer 12 and supplied to the anode catalyst layer 11. When methanol fuel is used as the fuel, the internal reforming reaction of methanol expressed by the following formula (1) occurs in the anode catalyst layer 11. When pure methanol is used as the methanol fuel, water produced by the cathode catalyst layer 14 and water in the electrolyte membrane 17 are reacted with methanol to cause the internal reforming reaction of the formula (1). Otherwise, the internal reforming reaction is caused by another reaction mechanism not requiring water.

$$CH_3OH + H_2O \rightarrow 6H^+ + CO_2 + 6e^- \qquad (1)$$

Electrons (e) generated by the above reaction are guided to outside via the power collector, supplied as so-called output to a load side, and then guided to the cathode (air electrode) 16. And, protons (H$^+$) generated by the internal reforming reaction of the formula (1) are guided to the cathode 16 through the electrolyte membrane 17. Air is supplied as an oxidant to the cathode 16. The electrons (e) and the protons (H$^+$) having reached the cathode 16 react with oxygen contained in the air within the cathode catalyst layer 14 according to the following formula (2), and water is generated by the reaction.

$$6H^+ + (3/2)O_2 + 6e^- \rightarrow 3H_2O \qquad (2)$$

The pump drive unit 2 controls the drive of the pump 104. The pump drive unit 2 controls on/off and the like of the pump 104 according to an instruction from the control unit 4.

The DC-DC converter 3 has an unshown switching element and energy accumulation element. Electrical energy generated by the fuel cell main body 1 is accumulated/discharged by the switching element and energy accumulation element, and a relatively low output voltage from the fuel cell main body 1 is increased to an appropriate voltage before it is outputted.

The temperature sensor SS1 is a sensor, such as a thermistor or a thermocouple, which is disposed near the cathode 16 and measures a temperature Tmp (cathode temperature, or DMFC temperature) of the cathode 16. A signal (temperature signal) indicating the measured result of the temperature Tmp from the temperature sensor SS1 is sent to the control unit 4 and used to control the fuel supply.

The fuel cell according to this embodiment does not use the outside temperature to control and does not require the measurement of the outside temperature, so that the device configuration is simplified. For example, it is not necessary to externally expose a sensor for measuring the outside temperature.

The voltage sensor SS2 is connected to a terminal of the power generation unit 101 and measures an output voltage from the power generation unit 101. Here, when the switch SW is opened to disconnect the load from the power generation unit 101, the voltage sensor SS2 can measure an open circuit voltage (OCV) Voc of the power generation unit 101.

The voltage sensor SS2 functions as "the voltage sensor to measure the open-circuit voltage of the fuel cell main body".

The voltage sensor SS2 may measure either a voltage of the power generation unit 101 alone or a voltage of a plurality (e.g., four) of the power generation units 101 connected in series (e.g., voltage of four in series). Since a sufficient voltage cannot be necessarily obtained when the power generation unit 101 is single, it is normal to have the plural power generation units 101 in the fuel cell. Here, the voltage sensor SS2 is determined to measure a voltage of four in series (provided that predetermined values V1 and V2 described later are also voltages of four in series).

The switch SW is driven by the control unit 4, and the connection between the power generation unit 101 and the DC-DC converter 3 (and therefore the connection between the power generation unit 101 and the load) is turned ON/OFF. The switch SW functions as "a connecting unit to connect a load to the fuel cell main body when the voltage measured by the voltage sensor is larger than the predetermined value".

The control unit 4 has a supply speed determining unit 41, a fuel supply control unit 42, a load connection control unit 43, and an abnormal supply judgment unit 44.

The supply speed determining unit 41 determines a fuel supply speed (Duty ratio D) both at the time of startup and steady operations. At the startup, the supply speed determining unit 41 determines the fuel supply speed (Duty ratio D) on the basis of the open-circuit voltage Voc measured by the voltage sensor SS2. On the other hand, at the steady operation, the supply speed determining unit 41 determines the fuel supply speed (Duty ratio D) such that the temperature Tmp becomes a target temperature Tt.

The supply speed determining unit 41 can directly determine the fuel supply speed. The supply speed determining unit 41 may also determine the fuel supply speed as a result of determination of both an operation time and a stop time of the pump 104 described later.

Here, it is assumed that the pump drive unit 2 controls whether or not the fuel is supplied to the power generation unit 101 by the pump 104. That is, the pump drive unit 2 does not directly control the fuel supply speed. The pump drive unit 2 controls temporally whether or not the fuel is supplied by the pump 104, and as a result, can control the fuel supply amount in a predetermined time. In other words, the fuel supply speed can be adjusted by controlling the operation time (hereinafter referred to as ON time) and stop time (hereinafter referred to as OFF time) of the pump 104.

At this time, a fuel supply speed V [g/sec] is represented by the Duty ratio D as expressed by the following formula (11).

$$V = Av * D \qquad \text{formula (11)}$$
$$D = t_{on} / (t_{on} + t_{of})$$
$$= t_{on} / t_{a1}$$

Av: proportional constant
$t_{on}$: time of fuel supply by pump 104 (ON time (operation time))
$t_{of}$: time of no fuel supply by pump 104 (OFF time (stop time))
$t_{a1} = t_{on} + t_{of}$: total of ON time and OFF time The fuel supply control unit 42 controls the pump 104 via the pump drive unit 2 so that the fuel is supplied at the Duty ratio D determined by the supply speed determining unit 41.

Specifically, the pump 104 is controlled so that fuel supply during the ON time $t_{on}$ and a stop of the fuel supply during the OFF time $t_{of}$ are repeated.

The fuel supply speed V might be varied due to a temperature or the like even if the Duty ratio D is constant as described later. That is, the proportional constant Av is variable depending on the temperature or the like.

The load connection control unit 43 controls the switch SW to turn ON/OFF the connection between the power generation unit 101 and the DC-DC converter 3 (and therefore the connection between the power generation unit 101 and the load). Specifically, the switch SW is kept OFF until the open-circuit voltage Voc reaches the predetermined value V1 (Voc<V1) to continue a state that the load is not connected to the power generation unit 101. When the open-circuit voltage Voc reaches the predetermined value V1 (Voc≥V1), the switch SW is turned ON, and the load is connected to the power generation unit 101.

When the open-circuit voltage Voc does not reach the predetermined value V1 even if the number of supply times (Cp) of the fuel to the power generation unit 101 exceeds a predetermined number of times (Cth) (Cp≥Cth), the abnormal supply judgment unit 44 judges that the fuel supply has suffered from an abnormality and stops the startup of the fuel cell. In this case, some means (image, voice, etc.) may be used to give warning to a user. The abnormal supply judgment unit 44 functions as a "judging unit to judge that the fuel supply from the fuel supply unit is abnormal in a case where the number of times of determining the supply speed by the supply speed determining unit is a predetermined number or more".

(Operation of Fuel Cell)

Figure 4:
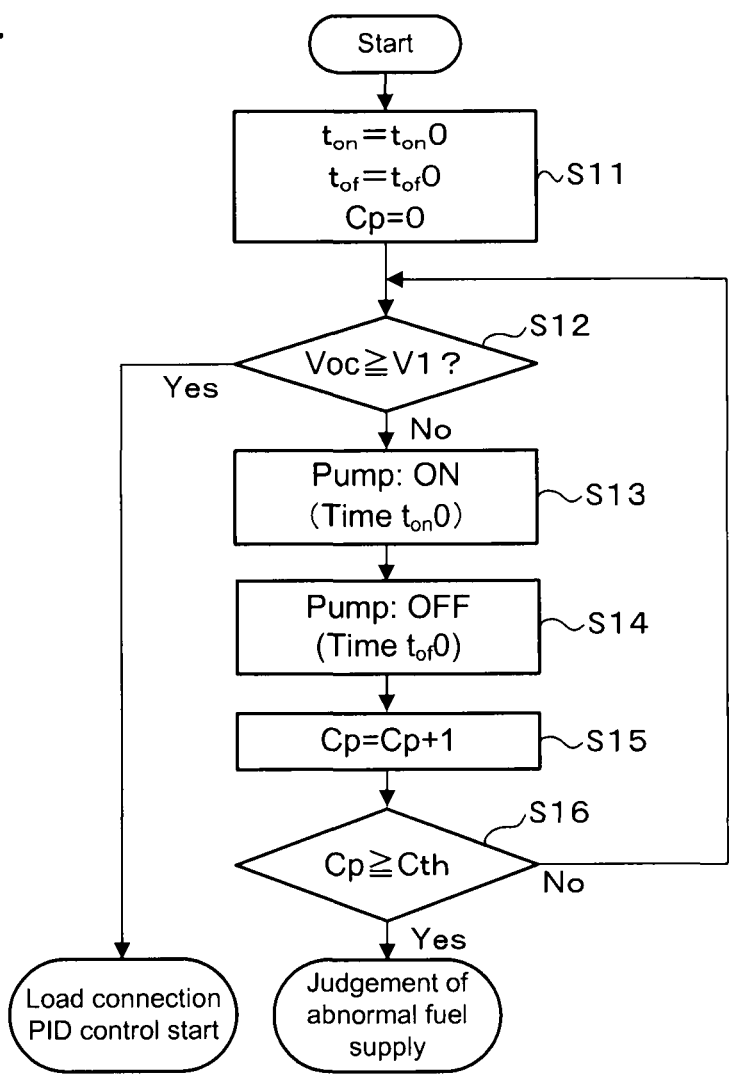
FIG. 4 is a flow chart showing a comparative example of a startup procedure of a fuel cell.
Figure 5:
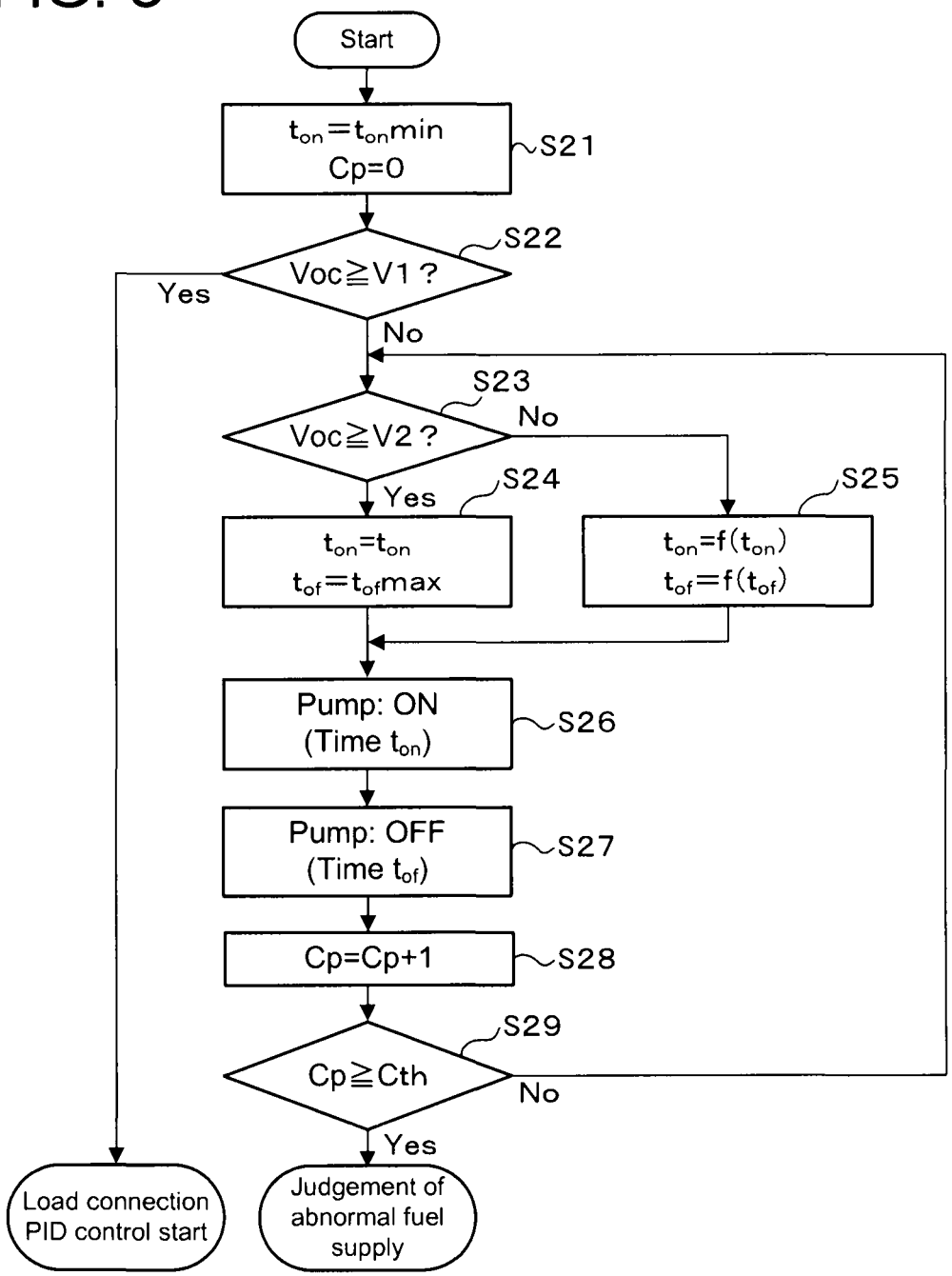
FIG. 5 is a flow chart showing an example of the startup procedure of the fuel cell.
Figure 6:
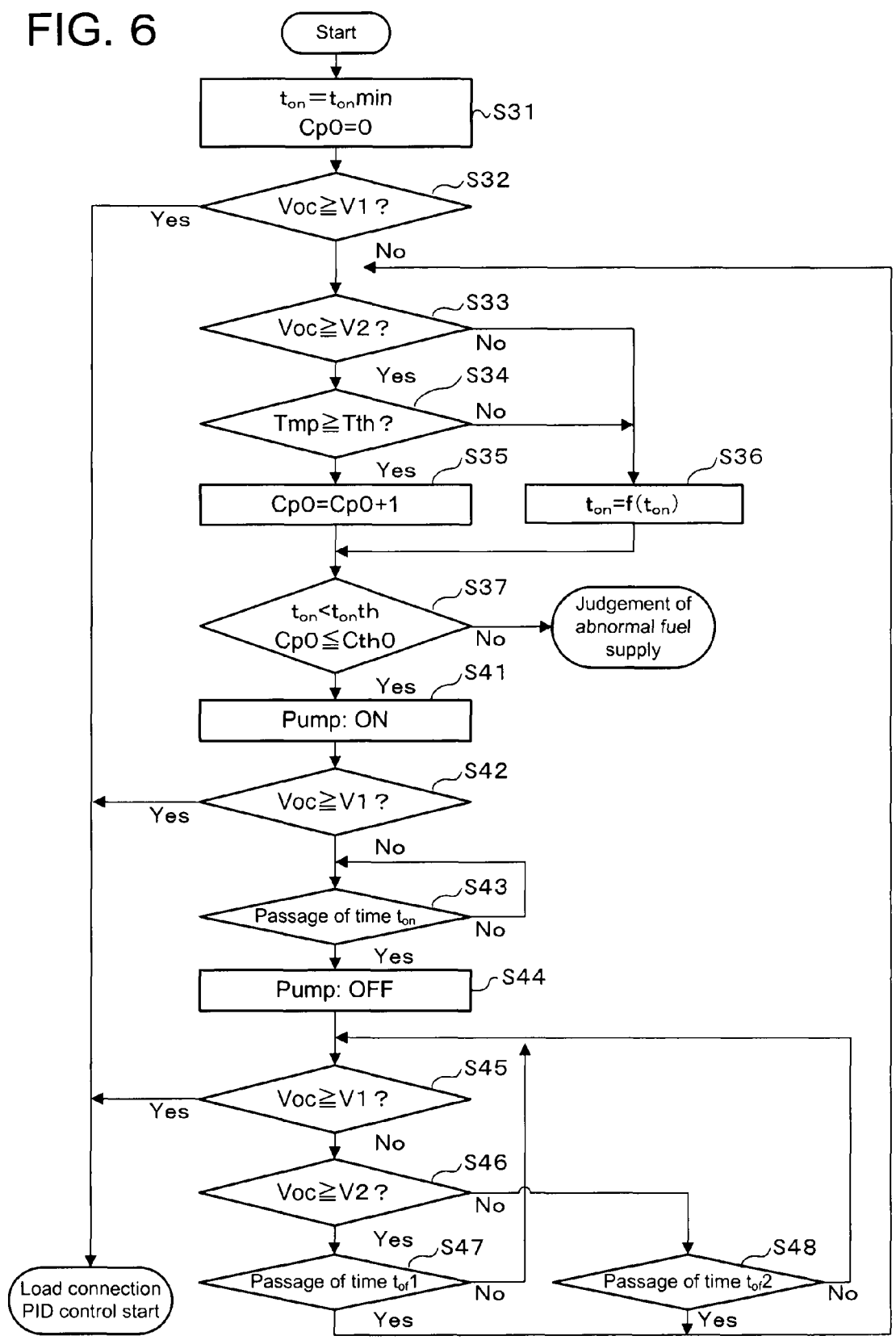
FIG. 6 is a flow chart showing another example of the startup procedure of the fuel cell.

Operation of the fuel cell is described below. FIG. 4 shows a startup procedure of the fuel cell according to a comparative example. FIG. 5 and FIG. 6 show startup procedures of the fuel cells according to the embodiment and a modified embodiment.

I. Startup Procedure of Fuel Cell According to Comparative Example

First, a startup procedure of the fuel cell according to the comparative example is described. In the comparative example, ON time $t_{on}$ and OFF time $t_{of}$ are respectively determined to be constant values ($t_{on}=t_{on}0$ and $t_{of}=t_{of}0$, Step S11). And, the pump 104 is operated with the ON time $t_{on}0$ and OFF time $t_{of}0$ until the open-circuit voltage Voc reaches the predetermined value V1 (Steps S12 to S14). When the open-circuit voltage Voc reaches the predetermined value V1 (Voc≥V1), a load is connected to the fuel cell, and the procedure moves to a steady operation state according to PID control. If the open-circuit voltage Voc does not reach the predetermined value V1, even when the number of times of operation Cp of the pump 104 becomes the predetermined value Cth or more (Cp≥Cth), it is judged as an abnormal supply of fuel (Steps S15 and S16).

As described above, the fuel cell is started with the constant ON time $t_{on}0$ and OFF time $t_{of}0$ in the comparative example. But, it was found that the startup of the fuel cell was occasionally instable with the constant ON time $t_{on}$ and OFF time $t_{of}$ (constant Duty ratio D). That is, it is preferable that the Duty ratio D is changed appropriately at the time of startup. It is described below.

(1) Behavior of Comparative Example in High Temperature Environment

Even if the ON time is constant in a high temperature environment, an inner pressure of the fuel storing unit (fuel tank) 102 increases, and a liquid sending amount (fuel supply speed V) from the pump 104 increases. Here, the open-circuit voltage Voc increases with a time lag after the fuel is sent. The temperature Tmp of the cathode 16 increases further late. In this case, when the ON time and OFF time optimized in a normal temperature environment (outside temperature of 25° C.) are used, there is a possibility that the temperature Tmp overshoots in the high temperature environment. It is because the fuel is supplied more than necessary when the open-circuit voltage Voc exceeds the predetermined value V1.

(2) Behavior of Comparative Example in Low-Temperature Environment

In a low temperature environment, the inner pressure of the fuel storing unit (fuel tank) 102 decreases and a liquid sending amount (fuel supply speed V) from the pump 104 decreases even if the ON time is constant. As a result, the increase rate of the open-circuit voltage Voc lowers, and it takes time to start the fuel cell.

And, since the liquid sending amount decreases, the number of operations Cp of the pump 104 increases inevitably. Therefore, the number of operations Cp reaches the predetermined number of times Cth before the open-circuit voltage Voc reaches the predetermined value V1, and there is a possibility that it is judged as abnormal fuel supply (such as out of fuel) even though the fuel storing unit 102 still has the fuel. On the other hand, when the number of operations Cp exceeds largely the predetermined number of times Cth, it takes time to judge the abnormal supply of the fuel, and a user's convenience is spoiled.

(3) Coping with High and Low Temperature Environments

Figure 7:
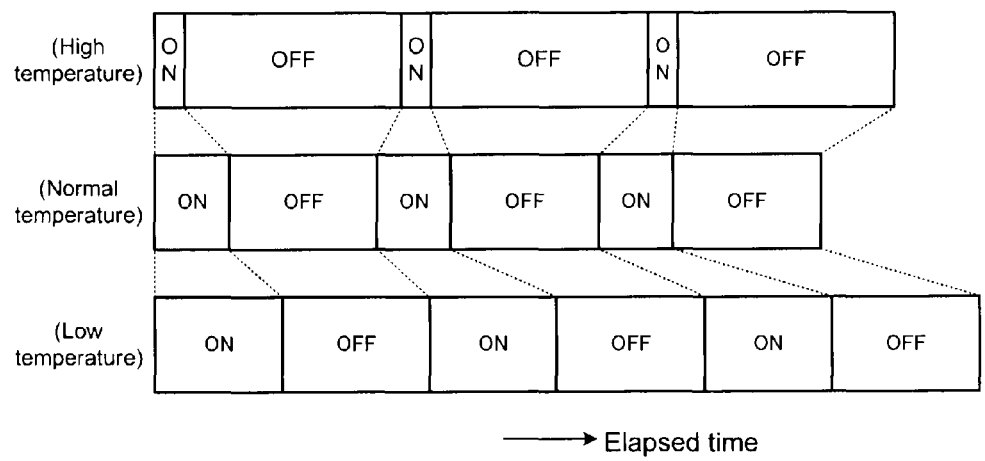
FIG. 7 is a schematic view showing an example of preferable ON time and OFF time.

Examples of preferable ON time and OFF time in high temperature environment and low temperature environment are shown in FIG. 7 and Table 1. FIG. 7 shows ON times and OFF times coping with a high temperature environment, a normal temperature environment (25° C.), and a low temperature environment. Table 1 shows preferable ON times and OFF times in the high temperature environment and the low temperature environment with respect to the ON times and OFF times in the normal temperature environment (25° C.).

TABLE 1

|  | ON Time $t_{on}$ | OFF Time $t_{of}$ |
|---|---|---|
| High Temperature Environment (Fuel Tank Inner Pressure: High) | Short | Long |
| Low Temperature Environment (Fuel Tank Inner Pressure: Low) | Long | as short as possible |

As shown in FIG. 7 and Table 1, it is preferable that the ON time is decreased and the OFF time is increased in the high temperature environment in a case where the ON time and OFF time are optimized in the normal temperature environment. To decrease the Duty ratio D, it is enough by varying only one of the ON time and the OFF time, but it is preferable that the ON time is decreased preferentially in order to prevent the fuel from being supplied in an excessive amount. It is because if the fuel is excessively supplied to the power generation unit 101, it is difficult to remedy a state of excessive amount of fuel other than the combustion of the excessive amount of fuel. That is, the increase of the OFF time may be determined as an incidental element.

It is preferable that the ON time is increased in the low temperature environment when the ON time is optimized in the normal temperature environment. On the other hand, it is preferable that the OFF time is adjusted to the same level or to be shorter in the low temperature environment when the OFF time is optimized in the normal temperature environment.

The more the OFF time is shortened, the more the time required for startup becomes short. But, when a delay of the increase of the open-circuit voltage Voc and the increase of the temperature Tmp with respect to the liquid sending is taken into consideration, it is not preferable to shorten the startup more than necessary.

At the time of startup in this embodiment, the ON time and the OFF time are determined on the basis of the open-circuit voltage Voc measured by the voltage sensor SS2. Thus, it becomes possible to control the ON time and the OFF time coping with the high temperature environment and the low temperature environment shown in FIG. 7 and Table 1 without measuring the outside temperature. Details are described later.

As described above, it is assumed that the fuel cell does not have a sensor for measuring the outside temperature, and the outside temperature is not measured directly. What is measured by the temperature sensor SS1 is the temperature Tmp of the DMFC itself, and it is not assured that the measured temperature has a value near the outside temperature. If the fuel is charged excessively, the inner pressure of the fuel storing unit 102 (fuel tank) might increase even at normal temperature, and it is preferable not to depend on the measurement of the outside air temperature. That is, it is preferable that startup is made stably in a wide environment.

II. Activation Procedure of Fuel Cell According to Embodiment

FIG. 5 is a flow chart showing an example of the startup procedure of the fuel cell. As described above, at the time of startup, the supply speed determining unit 41 determines the fuel supply speed (Duty ratio D) on the basis of the open-circuit voltage Voc measured by the voltage sensor SS2. Here, setting of the ON time and OFF time is changed when the open-circuit voltage Voc is smaller or larger than the predetermined value V2.

A. Initial Setting (Step S21)

ON time $t_{on}$ is set to a minimum value ($t_{on}$min, for example, 1 sec) ($t_{on}=t_{on}$min). And, a pump operation counter Cp is set to 0 (Cp=0). The pump operation counter Cp shows a number of times that the pump 104 has operated.

B. Determination of ON Time and OFF Time

It is judged whether the open-circuit voltage Voc is a predetermined value V1 (e.g., 1V) or more (Step S22). It is judged whether or not the startup is terminated. When the open-circuit voltage Voc is smaller than the predetermined value V1, it means the fuel cell is during startup, and the fuel supply speed (ON time and OFF time) is determined. Specifically, the open-circuit voltage Voc and the predetermined value V2 (V2<V1, for example, 0.5V) are compared (Step S23). The ON time $t_{o1}$ and OFF time $t_{of}$ are determined on the basis of the compared results (Steps S24 and S25).

(1) "Open-Circuit Voltage Voc<Predetermined Value V2" (Step S25)

When "open-circuit voltage Voc<predetermined value V2", the ON time $t_{on}$ is increased on the basis of a predetermined function ($t_{on}=f(t_{on})$). For example, it is increased by a predetermined multiple n (for example, two times) ($t_{on}=n*t_{on}$). And, the OFF time $t_{of}$ is determined on the basis of a predetermined function ($t_{of}=f(t_{of})$). For example, it is set to a minimum value (for example, 30 sec) ($t_{of}=t_{of}$min).

It is considered that the state "Voc<V2" continues just after the startup. Thus, when the state "Voc<V2" continues, the Step S25 is performed repeatedly, and the ON time $t_{on}$ increases every time it is repeated. For example, when the Step S25 is performed i times after the startup, the ON time $t_{on}$ is multiplied by $n^i$ and expressed by the following formula (12).

$$t_{on}=n^i*t_{on}\text{min} \quad \text{formula (12)}$$

Meanwhile, the OFF time $t_{of}$ is held to the minimum value ($t_{of}$min).

Figure 8:
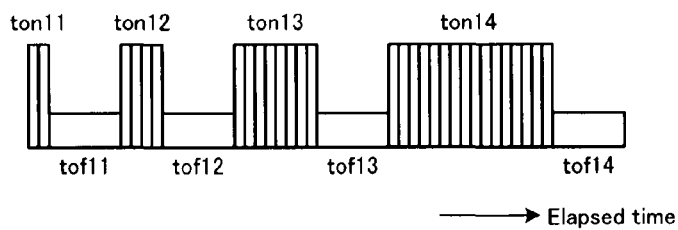
FIG. 8 is a schematic view showing an example of a temporal change of ON time and OFF time.

FIG. 8 is a schematic view showing an example of a change over time of the ON time $t_{on}$ and OFF time $t_{of}$ at that time. It is seen that the ON time $t_{on}$ increases from $t_{on}11$ to $t_{on}14$ by a predetermined function (here, n times (specifically, 2 times). Meanwhile, the OFF time $t_{of}$ is kept at a predetermined value (here, a minimum value ($t_{of}$min)) for all of $t_{of}11$ to $t_{of}14$.

As described above, when the state "Voc<V2" continues, the ON time $t_{on}$ increases, and the Duty ratio is increased. The continuation of the state "Voc<V2" after the startup means that the startup takes time, for example, an outside temperature is low, and the substantial supply amount of the fuel is small. Thus, when the fuel supply is insufficient and the startup takes time because the outside temperature is low, the startup time can be shortened by increasing the Duty ratio.

(2) "Open-Circuit Voltage Voc≥Predetermined Value V2" (Step S24)

When "open-circuit voltage Voc≥predetermined value V2", the ON time $t_{on}$ is kept constant ($t_{on}=t_{on}$). And, the OFF time $t_{of}$ is set to a maximum value ($t_{of}$max, for example, 120 sec (four times of minimum value $t_{of}$min (30 sec))) ($t_{of}=t_{of}$max).

It is considered that when a certain time passes after the startup, the state "Voc<V2" changes to a state "Voc≥V2". Thus, it is considered that the state "Voc≥V2" indicates that the startup process has proceeded to some extent, and the Duty ratio D is decreased by increasing the OFF time $t_{of}$.

Here, it is also considered that when the state "Voc≥V2", both of the ON time $t_{on}$ and the OFF time $t_{of}$ are kept constant, namely the Duty ratio is kept constant. Here, the OFF time $t_{of}$ is increased to secure a time for consumption of the fuel by considering a possibility that a final Duty ratio D in the state "Voc<V2" is excessive.

Figure 9:
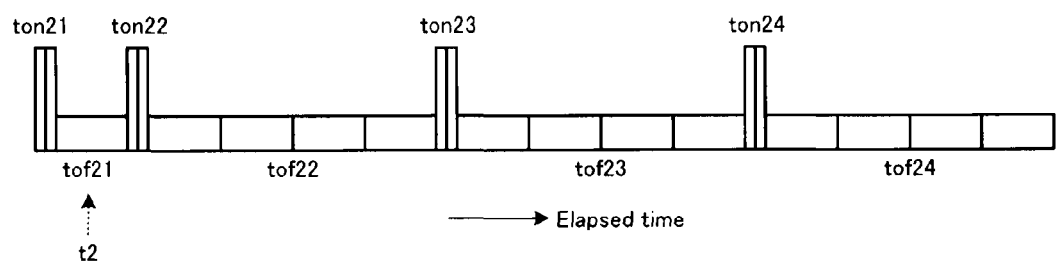
FIG. 9 is a schematic view showing an example of a temporal change of ON time and OFF time.
Figure 10:
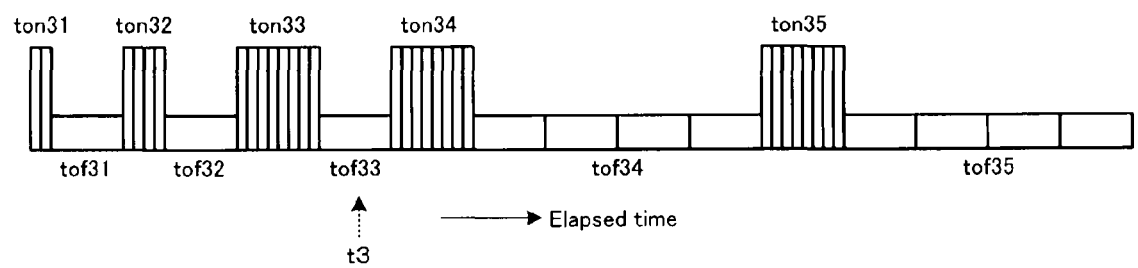
FIG. 10 is a schematic view showing an example of a temporal change of ON time and OFF time.

FIG. 9 and FIG. 10 are schematic views showing examples of changes over time of the ON time $t_{on}$ and the OFF time $t_{of}$ in the above case.

In FIG. 9, it is assumed that "Voc≥V2" is established at time t2 just after initiating the startup (just after liquid sending at the ON time $t_{on}21$). In this case, the ON time $t_{on}$ is kept at $t_{on}22$ to $t_{on}24$ and a value ($t_{on}21$) just after initiation of the startup. On the other hand, the OFF time $t_{of}$ is changed from the minimum value ($t_{of}$min) just after the initiation ($t_{of}21$) of the startup to and kept at $t_{of}22$ to $t_{of}24$ and the maximum value ($t_{of}$max). For example, since an outside temperature is high, "Voc≥V2" might be established just after the initiation of the startup when a substantial fuel supply amount is large.

In FIG. 10, it is determined that "Voc≥V2" is established at time t3 when a certain time has passed after the initiation of the startup. In this case, the ON time $t_{on}$ increases from $t_{on}31$ to $t_{on}33$, and kept at a constant value after the time t3. Meanwhile, it is determined that the OFF time $t_{of}$ is the minimum value ($t_{of}$min, 30 sec) until $t_{of}31$ to $t_{of}33$, and $t_{of}34$ and $t_{of}35$ after the time t3 are maximum values ($t_{of}$max, 120 sec).

(3) Control of Pump 104

The pump 104 is controlled according to the ON time $t_{on}$ and OFF time $t_{of}$ determined as described above (Steps S26 and S27). The pump 104 operates for the ON time $t_{on}$ to supply the fuel, and then it is stopped for the OFF time $t_{of}$ to stop the fuel supply. As a result, the fuel is supplied at the Duty ratio D. As described above, the Duty ratio D is determined by the time (cycle of ON time $t_{on}$, and OFF time $t_{of}$) when the state "Voc<V2" continues from C. Termination of startup (Step S22)

When the open-circuit voltage Voc reaches the predetermined value V1 or more, the startup of the fuel cell is terminated (movement to the steady operation). That is, a load is connected to the power generation unit 101, and the supply speed determining unit 41 determines a fuel supply speed (Duty ratio D) by PID control or the like such that the temperature Tmp becomes a target temperature Tt.

Here, the termination of the startup is judged before the supply speed is determined. But, the time of judgement may be changed to judge, for example, the termination of the startup during the operation or the stop of the pump 104.

The supply speed determining unit 41 can determine the Duty ratio D by using the following formula (13).

$$D = A \cdot (Tmp - Tt) + B \cdot \int (Tmp - Tt) dt + C \cdot d(Tmp - Tt)/dt \quad \text{formula (13)}$$

The formula (13) shows so-called PID (Proportional Integral Differential) control and determines the Duty ratio D on the basis of a proportional term $(A \cdot (Tmp-Tt))$, an integral term $(B \cdot \int(Tmp-Tt)dt)$ and a differential term $(C \cdot d(Tmp-Tt)/dt)$ of a deviation $(Tmp-Tt)$ between a current temperature Tmp and the target temperature Tt. PI (Proportional Integral) control may be used instead of the PID control.

The Duty ratio D is determined periodically by using the formula (13) or the like, and the fuel supply speed by the pump 104 is controlled, so that the fuel cell can be controlled to agree the temperature Tmp with the target temperature Tt.

D. Judgement of Abnormal Fuel Supply (Steps S28 and S29)

When an ON/OFF cycle (pump operation counter Cp) of the pump 104 reaches a predetermined number of times Cth (for example, 5 times), the startup stops. It is considered that the startup takes too much time, and the fuel supply has abnormality or the like (e.g., the fuel storing unit (fuel tank) 102 is out of fuel).

III. Startup Procedure of Fuel Cell According to Modified Embodiment

FIG. 6 is a flow chart showing another example (modified embodiment) of the startup procedure of the fuel cell. The procedure of this modified embodiment is not substantially different from the procedure of the embodiment of FIG. 5, and differences are mainly described.

(1) Separate Determination of on Time $t_{on}$ and Off Time $t_{of}$

In FIG. 5, ON time $t_{on}$ and OFF time $t_{of}$ are determined integrally in Steps S23 to S25. On the other hand, in the modified embodiment, the ON time $t_{on}$ and the OFF time $t_{of}$ are determined separately in Steps S33 to S36 and Steps S45 to S48.

It is because the ON time $t_{on}$ and the OFF time $t_{of}$ have a different determination condition. That is, to determine the ON time $t_{on}$, it is judged whether or not the temperature Tmp is larger than a predetermined value Tth (e.g., 40° C.) (Step S34). When the temperature Tmp is smaller than the predetermined value Tth (when judgement is No in Step S34), the ON time $t_{on}$ is increased on the basis of a predetermined function $(t_{on} = f(t_{on}))$ even when "Voc≥V2". For example, it is increased by a predetermined multiple n (for example, 2 times) (Step S36). It is because to judge the necessity of an increase of the fuel supply more correctly by addition of the temperature Tmp. If the temperature Tmp is low, the fuel supply might be insufficient even if "Voc≥V2".

(2) Unification of Determination of Off Time $t_{of}$ and Execution of Pump OFF

In FIG. 5, the determination of the OFF time $t_{of}$ (Steps S23 to S25) and the stop of the pump 104 (Step S27) are separated from each other. On the other hand, in the modified embodiment, the determination of the OFF time $t_{of}$ and the stop of the pump 104 are executed integrally (Steps S44 to S48). That is, after the pump 104 is stopped (Step S44), the OFF time $t_{of}$ is determined, and a time lapse is judged (Steps S46 to S48). It is because the determinations of the ON time $t_{on}$ and the OFF time $t_{of}$ are separated. But, the determination of the OFF time $t_{of}$ and the execution of the pump OFF may be made separately.

(3) Judgement of Termination of Startup

In FIG. 5, judgement to terminate the startup is made only one time in one cycle (Step S22). On the other hand, in the modified embodiment, the termination of the startup is judged before the determination of the OFF time $t_{of}$ (Step S32), during the operation of the pump 104 (Step S42), and during the stop of the pump 104 (Step S45). To quickly terminate the startup to supply power to a load, a number of times to judge the termination of the startup is increased. The termination of the startup is repeatedly judged while the pump 104 is not in operation.

(4) Judgement of Abnormal Fuel Supply

In FIG. 5, abnormal fuel supply is judged according to the ON/OFF cycle (pump operation counter Cp) of the pump 104. On the other hand, in the modified embodiment, when the ON time $t_{on}$ is smaller than a predetermined value $t_{on}$th (for example, 64 sec) ($t_{on} < t_{on}$th) and the pump operation counter Cp0 has a predetermined value Cth0 (for example, five times) or less, it is judged that the fuel supply is free from an abnormality (Step S37). That is, when the pump operation counter Cp0 becomes larger than the predetermined value Cth0 and the ON time $t_{on}$ is the predetermined value $t_{on}$th or more, it is judged that the fuel supply has an abnormality. The case that the ON time $t_{on}$ is the predetermined value $t_{on}$th or more is subject to judgement, and the ON time $t_{on}$ is prevented from being increased excessively (excessive fuel supply).

Here, counting by the pump operation counter Cp0 is performed only when the fuel supply becomes constant (Step S35). Meanwhile, the ON time $t_{on}$ depends on the number of times that Step S36 is executed as expressed by the formula (12). As a result, the case where the fuel supply becomes constant (Step S35) and the case where the fuel supply is increased (Step S36) are counted separately in the modified embodiment, and when the fuel supply exceeds the respective predetermined values (Cth0 and Cth1=LOG n ($t_{on}$th/$t_{on}$min)), it is judged that the fuel supply has an abnormality. That is, a number of operation times of the pump 104 is counted as a whole in FIG. 5, and when "Voc<V2" and "Voc≥V2" in the modified embodiment, they are counted separately.

Thus, the cases that the fuel supply is increased and not increased are counted separately, so that the accuracy of the judgment of abnormalities can be improved.

When the ON time of the pump 104 exceeds a predetermined time at the startup, the pump drive frequency may be decreased (specifically, ½ of an initial frequency) on the basis of a predetermined function. It is because the pressure in the fuel storing unit 102 is decreased by suctioning the fuel from the fuel storing unit 102 when the pump 104 is turned ON to send well the fuel to the fuel distribution mechanism. That is, a fuel discharge pressure of the pump 104 is increased by lowering the pump drive frequency, so that good liquid sending can be made even when the pressure in the fuel storing unit 102 is decreased to a low level.

EXAMPLE

A result of starting the fuel cell by the startup procedure according to the above-described modified embodiment is described below.

(1) Check of Operation in High Temperature Environment

As a result of a startup test in a high temperature environment (outside temperature of 38° C.), a temperature Tmp was little under 50° C. at maximum, and the overshoot of the temperature Tmp did not occur.

In the high temperature environment where the pump flow rate becomes large, "open-circuit voltage Voc≥predetermined value V2" is true when the ON time $t_{on}$ is short, and the OFF time $t_{of}$ becomes a maximum value ($t_{of}$max, 120 sec). That is, the ON time $t_{on}$ and the OFF time $t_{of}$ change as shown in FIG. 9.

(2) Check of Operation in Low Temperature Environment

As a result of a startup test in a low temperature environment (outside temperature of 5° C.), it takes about 5 min to 6 min when the open-circuit voltage Voc rises to the predetermined value V1 (completion of startup), which is shorter than the startup time (20 min) in the comparative example.

In the low temperature environment where the pump flow rate becomes small, the ON time $t_{on}$ becomes long, "open-circuit voltage Voc≥predetermined value V2" becomes true, and the ON time $t_{on}$ continues. That is, the pump behavior becomes as shown in FIG. 10. Since the ON time $t_{on}$ is extended to some extent, the fuel supply amount can be secured, and a rise time of the open-circuit voltage Voc becomes shorter than that in the startup method of the comparative example.

As described above, the operation of the pump 104 corresponding to the preferable ON time $t_{on}$ and OFF time $t_{of}$ shown in FIG. 7 and Table 1 can be realized both in a high temperature environment and in a low temperature environment. That is, it becomes possible to start the fuel cell which has secured robustness with respect to an outside temperature and a fuel tank inner pressure.

And, the completion of startup can be promoted by increasing the Duty ratio at a low temperature, or the like. It means that there is no problem even if the reference values (Cth and Cth0) at the time of the judgement of an abnormal fuel supply are decreased. As a result, the time required for the judgement of an abnormality which took about 20 minutes in the comparative example can be shortened to five minutes (¼).

While certain embodiments have been described, these embodiments have been presented by way of example only, and are not intended to limit the scope of the inventions. The novel embodiments described herein may be embodied in a variety of other forms; and various omissions, substitutions and changes may be made without departing from the spirit of the inventions. Such embodiments or modifications are intended to be included within the scope and spirit of the inventions and also covered by the accompanying claims and their equivalents.

What is claimed is:

1. A fuel cell, comprising:
a fuel cell main body to generate power by using a liquid fuel;
a fuel supply unit to supply the fuel to the fuel cell main body;
a voltage sensor to measure an open-circuit voltage of the fuel cell main body;
a supply speed determining unit configured to determine an operation time when the fuel is supplied from the fuel supply unit to the fuel cell main body and a stop time when the fuel is not supplied from the fuel supply unit to the fuel cell main body on the basis of the measured result by the voltage sensor when the voltage measured by the voltage sensor is smaller than a predetermined value;
a fuel supply control unit configured to control the supply of the fuel by the fuel supply unit on the basis of the determined operation time and stop time; and
a connecting unit to turn on a connection between a load and the fuel cell main body when the voltage measured by the voltage sensor is larger than the predetermined value;
wherein the supply speed determining unit is configured to keep the operation time constant when the voltage measured by the voltage sensor is smaller than the predetermined value and larger than a second predetermined value which is smaller than the predetermined value; and
wherein the supply speed determining unit is configured to increase the operation time when the voltage measured by the voltage sensor is smaller than the second predetermined value.

2. The fuel cell according to claim 1,
wherein the supply speed determining unit is configured to increase the operation time when the fuel cell main body has a temperature lower than a predetermined temperature.

3. The fuel cell according to claim 1,
wherein the supply speed determining unit is configured to determine the operation time and the stop time repeatedly; and
wherein the supply speed determining unit is configured to increase the operation time by a predetermined multiple of the previous operation time when the voltage measured by the voltage sensor is smaller than the second predetermined value.

4. The fuel cell according to claim 1,
wherein the supply speed determining unit is configured to keep the operation time and stop time constant when the voltage measured by the voltage sensor is smaller than the predetermined value and larger than the second predetermined value which is smaller than the predetermined value.

5. The fuel cell according to claim 1,
wherein the supply speed determining unit is configured to determine the operation time and the stop time repeatedly, and
further comprising a judging unit configured to judge the fuel supply from the fuel supply unit is abnormal in a case where a number of times of the supply speed is a predetermined number or more.

6. The fuel cell according to claim 5,
wherein the supply speed determining unit is configured to determine the operation time repeatedly; and
wherein the judging unit is configured to judge that the fuel supply from the fuel supply unit is abnormal when the operation time is a predetermined value or more.

7. The fuel cell according to claim 1,
wherein the fuel supply unit does not circulate the fuel.

8. The fuel cell according to claim 1,
wherein the connecting unit turns on when a startup procedure of the fuel cell is terminated.

* * * * *